Feb. 6, 1962     J. C. GEVAS     3,020,535
ANALOG TO DIGITAL CONVERSION SYSTEM
Filed July 10, 1959
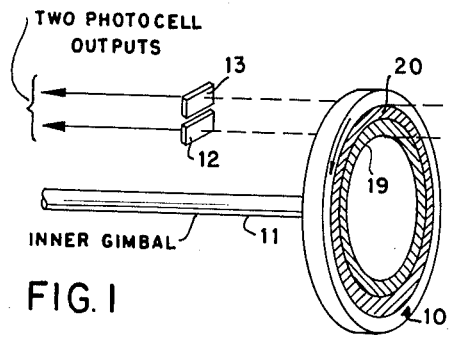
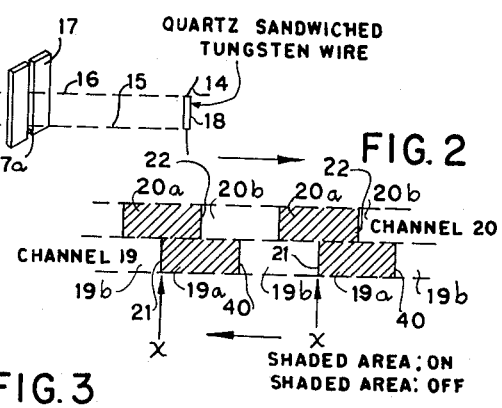
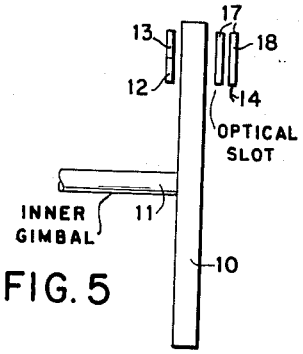
CODE LOGIC
| CHANNEL | | PHOTO CELL OUTPUT AT POSITION X | DIRECTION-SENSED PULSE |
|---|---|---|---|
| RIGHT TO LEFT | 20 | ON | PLUS |
| | 19 | OFF TO ON | |
| LEFT TO RIGHT | 20 | ON | MINUS |
| | 19 | ON TO OFF | |
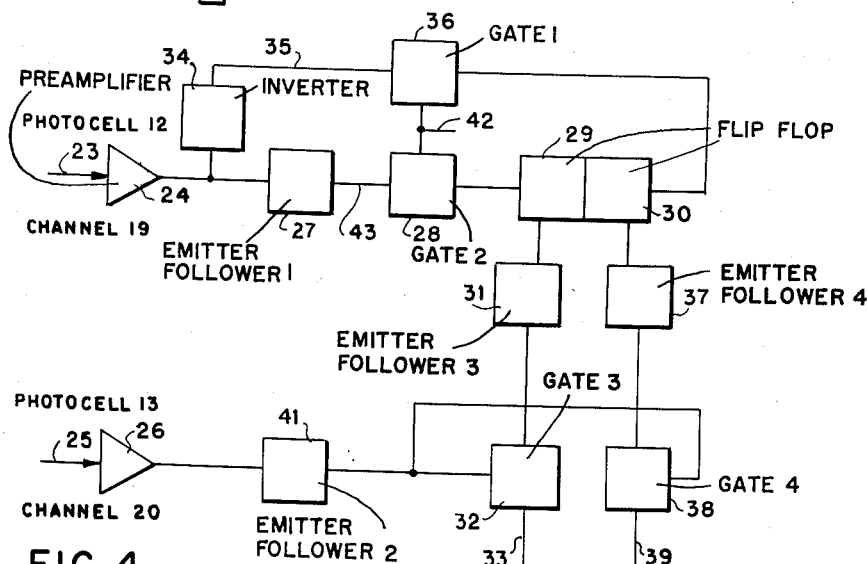
James Constantine Gevas
INVENTOR.
ATTORNEYS United States Patent Office 3,020,535
Patented Feb. 6, 1962

3,020,535
ANALOG TO DIGITAL CONVERSION SYSTEM
James C. Gevas, Newark, N.J., assignor to General Precision, Inc., a corporation of Delaware
Filed July 10, 1959, Ser. No. 826,284
12 Claims. (Cl. 340—347)

This invention generally relates to improvements in electrical pick-off devices and more particularly to devices for measuring the displacement and rate between two relatively movable members and protruding an electrical digital output indication thereof compatible with digital computation means.

Although the invention is not limited thereto, a preferred form is particularly useful and advantageous for measuring the angular movement and rate of a gyroscope gimbal, due to its small size, relatively few parts, and considerable accuracy and sensitivity.

In the development of typical automatic navigation and control systems for craft, it has been most convenient for the system to receive analog electrical input signals representing gyro gimbal displacements and other input commands because of the relative ease of adding, subtracting, or otherwise combining analog electrical signal voltages as desired. However, with the development of more sophisticated systems, the increased number of such command input quantities and the speed and accuracy required for computation has necessitated the use of digital computers, which in turn has required the converting of the analog electrical input quantities into a digital form compatible with the digital operation of the computer.

To provide this function, the practice most commonly employed is to continue using analog pickoffs directly associated with the instrument to be utilized and converting the analog electrical signal into the desired digital form by means of a remotely located analog-to-digital converter mechanism. However, this practice is obviously unsatisfactory in many aircraft and other applications due to the additional weight and size of the added converters, as well as the increased probability of static and dynamic errors due to the increase in system complexity.

To overcome these disadvantages according to the present invention there is provided an improved digital pickoff means that is directly associated with the members whose displacement and rate is to be measured and that is adapted to directly produce two series of digital impulses; the first series representing the extent of displacement of the member in one direction and the second representing the extent of displacement in the opposite direction. By summing each of these two series of impulses, an accurate measure of displacement from a given reference is obtained, and by summing these impulses during given time intervals, the respective rates of displacement are obtained.

It is accordingly a primary object of the invention to provide a direct reading digital pickoff of small size, few parts, and great accuracy. For example, in a stable platform having three gyros thereon, only two additional slip rings for each axis are required in the conversion mechanism.

Another object is to provide such a device capable of accurately measuring the displacement and rate between relatively movable members at both high and low rates of movement.

Still another object is to provide such a pickoff that can be efficiently multiplexed and easily integrated into the programming of a central digital computer.

A still further object is to provide such a pickoff capable of remembering incremental movements during readout.

Another object is to produce such a pickoff that may be constructed with conventional manufacturing tolerances and does not require, for example, unusual care and precision in forming the code.

Other objects and many attendant advantages will be more readily comprehended by those skilled in the art after a detailed consideration of the following specification and drawings wherein:

FIGURE 1 is a perspective view of a preferred code wheel and photosensing means according to one preferred embodiment of the invention.

FIGURE 2 is an enlarged view of a portion of the code wheel of FIGURE 1 for illustrating a preferred mark-space code arrangement.

FIGURE 3 is a table for illustrating the code logic.

FIGURE 4 is a block diagram representation of an electrical circuit operating according to the code logic.

FIGURE 5 is a cross-sectional view of the preferred code wheel, light source and photosensors.

Referring now to the drawings, for a detailed consideration of one embodiment of the invention, there is shown in FIGURE 1, a code wheel 10 supported on a shaft 11 for rotation therewith, and a pair of light sensitive devices, such as photosensors 12 and 13, mounted on a stationary support fixedly spaced alongside the rear face of wheel 10, as shown, and having the function of detecting the rotation of the wheel.

On the opposite side or front face of wheel 10, there is provided a light producing source 14 for generating a line beam of light generally indicated by the dotted lines 15, 16 which may be further focused or shaped in linear form by means of an optical line slit 17a which is formed on a pair of aligned opaque sheets, 17, the slit 17a permitting passage of only a thin uniform line light beam to the code wheel 10. The optical slit 17a may be formed of an upright vertical plate member or members 17, having one surface thereof coated by an opaque material. A narrow vertical line transparency 17a may be provided through the member by etching or otherwise removing a narrow line section of the opaque marking along line 17a thereby to permit passage of the thin line beam of light 15, 16 therethrough.

The line beam of light 15, 16 is preferably mainly in the infra-red bandwidth produced by a dull-red heated tungsten wire 14 restrained against movement by being sandwiched by a pair of quartz crystal plates 18. The sandwiching crystal plates 18 prevent mechanical movement of the wire 14, thus, providing the required straight line source and maintaining constant alignment thereof. The thinness of the line beam of light 15, 16 may be further controlled to a certain degree by varying the magnitude of the current energizing the wire 14 which, in turn, varies the thickness of the radiating line on the wire.

With the arrangement of light source 18 and optical slit 17a as above described, it has been found that a rather accurate line beam of light 15, 16 may be obtained without the need for extremely accurate mechanical alignments and tolerances. No optical problems of a significant nature occur, nor are compensation optical lenses or other correcting or precision devices needed. For example, it has been found unnecessary to provide a high tolerance tungsten wire power supply or accurate dropping resistors.

The code wheel 10 is preferably formed with two concentric annular code channels 19 and 20, each having alternately transparent-opaque code markings therethrough, thereby to transmit or block the passage of the light beam therethrough to the photosensors, depending upon the rotative position of the code wheel 10 referenced to the fixed light beam.

As best shown in FIGURE 2 illustrating the code markings 19 and 20 in an enlarged view, the outer channel code 20 is comprised of a series of equal length transparent portions 20a, shown as the shaded areas, alternating with equal length opaque markings 20b; and inner code channel 19 is likewise formed in the same manner but with the transparent-opaque markings 19a and 19b thereon being advanced in position with respect to those in the outer code channel 20. Thus assuming that the wheel 10 or other member carrying the code markings of FIGURE 2 is being displaced counter-clockwise or from right-to-left past the fixed light beam at a position X, the light beam will initially pass through transparent portion 20a of channel 20, while it is still blocked from passing through opaque marking 19b of the channel 19. However, when the leading edge 21 of the transparent portion 19a reaches position X, the light beam is permitted to pass through both channels until the trailing edge 22 of the transparent portion 20a of channel 20 passes position X, whereupon light may pass through only the inner channel 19 but not through the outer channel 20.

To form the transparent-opaque markings of each code 19 and 20, the code wheel 10 may be processed by known optical grating ruling techniques. As is known to those skilled in the art, such optical grating techniques may be easily carried out with production type machinery without the need for excessively close tolerances. For larger production quantities, however, photographic techniques for forming the transparent-opaque markings of each code are preferred as being more economical in large scale production.

As thus far described therefore, there is provided a code wheel 10 that is rotatable with movement of the shaft whose angular displacement is to be measured, and carrying two phase displacement on-off coded channels thereon, and a pair of photosensors, each of which alternately receives and is being blocked from receiving light during rotation of the code wheel by a group of areas of one of the coded channels which are divided and located in an out-of-time phase arrangement relative to one another. Consequently as the coded wheel 10 revolves, the voltage signal being generated by each photocell will increase as it scans each transparent portion of its related code and decrease as it scans each opaque marking, whereby a count of the number of such increases or decreases reflects the number of markings that pass the photosensor and hence accurately represents at any time the angular displacement of the wheel from a given starting position.

It is particularly important, however, to note that a count of the photosensor output signal changes does not indicate an absolute angular displacement but merely the displacement from an initial starting position which may or may not be the desired zero-position. In other words, the photosensor of the present invention counts only the number of equally-spaced incremental markings that pass the photosensor, and if the code wheel 10 is initially displaced from a predetermined zero position before the counting is commenced, this error angular displacement must be added to the count to yield the absolute angular displacement from this zero position.

As thus far described, it is further evident that if the sole function to be performed is to determine the displacement of the member and wheel 10 in a single direction, i.e. from right-to-left in FIGURE 2, it is only necessary to employ one coded channel such as 19, and one photosensor 12 associated therewith, since each photosensor is excited a number of times proportional to the displacement. However, since it is also desired to measure displacement in the opposite direction according to the present invention, a pair of code channels 19 and 20 and sensors 12 and 13 are employed using what might be termed a code logic as best described in connection with FIGURES 2 and 3.

Referring again to FIGURE 2 and to FIGURE 3 for an understanding of this logic circuit, it is noted that when the code markings are positioned with respect to the light beam at position X as shown, the photosensor 13 receives light through transparent portion 20a and is consequently "ON" as shown in the uppermost line of the table of FIGURE 3, whereas the leading edge 21 of transparent portion 19a of the code channel 19 has just reached the position X of photosensor 12. If in approaching this position, the code carrying wheel 10 or member is being displaced from right-to-left in FIGURE 2, the photosensor 12 recives light through the transparent portion 19a as the edge 21 passes position X, and consequently its output signal varies from an "off" to an "on" condition, as shown by the second line of the table of FIGURE 3.

Thus observing the first two lines of the table of FIGURE 3, it is noted that if a count is taken each time the output of upper photosensor 13 indicates an "on" condition and simultaneously therewith the photosensor 12 had just varied from an "off" to an "on" condition, such an accumulated count accurately represents the extent of counter-clockwise displacement of the wheel 10, or the total movement thereof from right-to-left in FIGURE 2.

Alternatively, if the code wheel 10 is in the position of FIGURE 2, and is traveling in the opposite direction, i.e. from left-to-right, the photosensor 12 first receives light through transparent portion 19a, and then as the edge 21 thereof passes the photosensor, the opaque marking 19b blocks the passage of light to photosensor 12, whereby its signal output varies from an "on" to an "off" condition (as indicated on line 4 of the table of FIGURE 3) or opposite to the change experienced when the code wheel is traveling from right-to-left as discussed above and noted on the second line of the table of FIGURE 3.

Thus, by measuring the outputs of the two photosensors according to the present invention, electrical signals may be obtained that indicate both the incremental displacement of the code carrying wheel 10 and the direction of such displacement.

Referring now to the block diagram of FIGURE 4, for an understanding of the circuitry employing the differing signals being generated by the photosensors 12 and 13 to produce two series of impulses, each series representing the displacement of the code wheel in a different direction, the output signal from photosensor 12 is first directed over line 23 to an amplifier 24, and the output signal from photosensor 13 is directed over a separate input line 25 to an amplifier 26.

Assuming that the photosensor 12 has just varied from an "off" to an "on" condition, whereby its electrical voltage output is increased, this increased signal voltage is further directed through a second amplifier 27 and thence through a gate circuit 28 to energize the left-hand element 29 of a flip-flop circuit to render this element 29 conducting and the opposite element 30 non-conducting. This off-to-on change of flip-flop element 29 produces a steep wave front voltage which is directed through a pulse forming amplifier 31 and the impulse produced is directed through a gate 32 to output line 33. Thus assuming that gates 28 and 32 are open, the first increase in signal voltage of photosensor 12 produces a voltage impulse over output line 33. Input line 23 thereafter remains energized with this increased voltage as long as photosensor 12 receives light through a transparent portion 19a of the code wheel 10, and maintains flip-flop element 29 conducting.

However, as the code wheel continues its movement from right-to-left in FIGURE 2, the transparent portion 19a of channel 19 passes photosensor 12 and the next succeeding opaque marking 19b reaches the photosensor, thereby blocking off the light beam and lowering the photosensor output signal voltage. This lower output voltage is directed through amplifier 24, as before, but in this instance, cannot pass through amplifier 27 which is suitably biased to only transmit a higher voltage signal.

Rather, this lower voltage is transmitted through the inverter amplifier 34 that produces a voltage over line 35 and thence through a gate 36 to energize the opposite flip-flop element 30, rendering it conductive and the first flip-flop element 29 non-conducting. Thus, as the photosensor 12 changes from an "on" to an "off" condition in response to an opaque marking 19b of the code channel 19 being scanned by the photosensor, the reduction in the photosensor signal voltage resets the flip-flop elements so that element 29 is rendered non-conducting and element 30 conducting.

Thereafter, as the code wheel continues to turn counter-clockwise or from right-to-left in FIGURE 2, the leading edge 21 of the next succeeding transparent code portion 19a passes photosensor 12 and again changes the photosensor output from "off" to "on." This increase in signal voltage is again directed through amplifier 27 and gate 28 to reverse the condition of the flip-flop, and again render element 29 conducting, which thereupon initiates the transmission of a second impulse over output line 33, indicating that the code wheel 10 has rotated through two increments. Thus, as the code wheel 10 moves from right-to-left in FIGURE 2, the leading edge 21 of each transparent portion 19a passing by the photosensor turns "on" the photosensor 12, resulting in an impulse being transmitted over output line 33; and as each such transparent portion 19a passes by and the next opaque marking 19b blocks off the light beam, the reduced photosensor signal serves to reset the flip-flop 29, 30 in condition to receive the next succeeding change in signal from photosensor 12.

As is now believed evident, the function being provided by amplifier 27 and inverter amplifier 34 is to isolate the flip-flop elements 29 and 30 from the signal of photosensor 12 to the extent of allowing only the higher voltage or "on" condition of the photosensor to energize flip-flop element 29 and allowing only the lower voltage or "off" condition of photosensor to energize element 30. Thus, whenever the photosensor 12 is varied from "off" to "on," the flip-flop element 29 is rendered conducting and whenever the photosensor is varied from "on" to "off," the opposite flip-flop element 30 is made conducting.

To measure displacement of the code wheel 10 in the opposite direction, or clockwise, in FIGURE 1, the components and mode of operation are substantially the same. Referring to FIGURE 2, and assuming that the code channels 19 and 20 are traveling from left-to-right (code wheel 10 rotating clockwise), it is noted that the trailing edge 40 of the transparent code portion 19a of channel 19 first reaches the photosensor 12 turning it "on" and the photosensor is turned "off" as the leading edge 21 of this transparent portion 19a passes by the light beam at position X. A change from "on" to "off" reduces the photosensor voltage signal over line 23, and this reduced voltage is transmitted through amplifier 24 to inverter 34 and gate 36 and thence is directed to energize the right hand flip-flop element 30, rendering this element 30 conducting and element 29 non-conducting. As element 30 is made conducting, a steep wave front voltage is directed to a pulse forming amplifier 37, which is substantially identical to the pulse forming amplifier 31 discussed above, and consequently produces an impulse through a gate circuit 38 which is transmitted over the second output line 39.

Thereafter as the code wheel 10 continues its movement from left-to-right in FIGURE 2, the photosensor 12 is again turned "on" after the passage of the trailing edge 40 of next succeeding transparent portion 19a and generates a more positive voltage through amplifiers 24 and 27 and through gate 28 to render flip-flop tube 29 conducting, thereby resetting the flip-flop for the next count which occurs after this same transparent portion 19a has passed by. When this occurs, the tube 12 is turned from "on" to "off" and the lower voltage is directed through inverter 34 and gate 36 to again render flip-flop tube 30 conducting and thereby initiate a second impulse over output line 39 indicating that the code wheel 10 has moved two increments from left-to-right in FIGURE 2, or in the clockwise direction.

Thus, for each incremental movement of the code wheel 10 in the counter-clockwise direction, an impulse is transmitted over output line 33 and for each incremental movement in the clockwise direction, an impulse is transmitted over the second output line 39.

As thus far described, it is evident that all counting impulses being generated over both of output lines 33 and 39 are initiated by the action of photosensor 12 in response to scanning of the mark-space code 19. When the code wheel moves counterclockwise or from right-to-left, each change of the photosensor 12 from "off" to "on" produces an output impulse over line 33 and each change from "on" to "off," as the opaque marking 19b is scanned, serves to reset the flip-flop. However, since either flip-flop tube 29 or 30, in changing from "off" to "on" produces a steep edged voltage which will initiate an impulse through its associated pulse forming amplifier 31 or 37, respectively, it is essential that impulses being generated during the resetting of the flip-flop elements not be permitted to pass out over the related output line. To perform this discriminating function, the second photosensor 13 and its associated mark-space code 20 is employed. Referring again to FIGURE 2, for an understanding of the manner whereby the second photosensor 13 performs such a discriminating function, it is noted that the transparent portions 20a of the code 20 overlap those of the code 19. That is, both codes are simultaneously transparent from the leading edge 21 of the transparent portion 19a to a position about halfway between this leading edge 21 and the trailing edge 40 of such portions 19a, and for all other portions on the wheel only one or the other of the transparent portions are in line with a photosensor, but not both.

According to the present invention, this condition is employed to control the generation of output impulses whereby output impulses are only permitted to pass during the time interval that the transparent portion 20a is being scanned by photosensor 13, and that photosensor 12 is changing state from "on" to "off" or from "off" to "on."

Referring to FIGURE 4, for an understanding of the circuitry for performing this function, the signal from photosensor 13 is directed over line 25 and through a pair of amplifiers 26 and 41 to control the condition of output gates 32 and 38, each of which is in circuit with a different one of the output lines 33 and 39, respectively. Upon a transparent portion 20a of the code 20 being scanned by photosensor 13, the more positive photosensor voltage is amplified and directed to open both the gates 32 and 38 thereby permitting impulses generated during this interval to pass out over the output lines 33 and 39. On the other hand, whenever photosensor 13 is not scanning a transparent portion 20a, the voltage from amplifier 41 is not sufficient to open the gates 32 and 38 and impulses initiated by changes in flip-flop elements 29, 30 are not permitted to pass over output lines 33 and 39. Returning to FIGURE 2, it is noted that when the code wheel is traveling from right-to-left, the photosensor 12 is turned from "off" to "on" whenever the leading edge 21 of transparent portion 19a is scanned by the the photosensor 12 and is reset from "on" to "off" as the trailing edge 40 passes by. However, due to the fact that the transparent portion 20a of code 20 is displaced from that of code 19, the photosensor 13 scans a transparent portion 20a only when the leading edge 21 is scanned by photosensor 12, but not while the trailing edge 40 is being so scanned. Consequently, at the time that photosensor 12 is changing from "off" to "on," the gates 32 and 38 are opened and a counting impulse may pass therethrough, as discussed above, but during the time interval that photosensor 12 is scanning the trailing edge 40 and the flip-flop circuit 29, 30 is being reset, the gates 32 and 38 are closed and the resetting of the flip-flop elements cannot produce a spurious output impulse over output line 39.

Similarly, when the code wheel 10 is traveling clockwise or from left-to-right in FIGURE 2, the photosensor 13 is scanning a transparent portion 20a only as the leading edge 21 portion of transparency 19a is being scanned by photosensor 12 and photosensor 12 is changing from "on" to "off." Consequently, when the code wheel 10 is traveling from left-to-right, each "on" to "off" change of photosensor 12 initiates the transmission of an impulse over the second output line 39, but during the resetting of flip-flop 29, 30 resulting from the edge 40 of transparency 19a being scanned by photosensor 12, the impulses being produced cannot pass through closed gate 32.

Recapitulating the operation of the logic circuit of FIGURE 4, in permitting output pulses to be directed over one or the other of the output lines 33 or 39, depending upon the direction of movement of the code wheel 10, the photosensors 12 and 13 simultaneously scan transparent portions 19a and 20a only in the vicinity of the leading edge 21 of transparent portion 19a and consequently only at these positions can impulses be transmitted by the gate circuits 32 and 38. If the code wheel 10 is traveling counter-clockwise or from right-to-left in FIGURE 2, the leading edge 21 approaches photosensor 12 from the right and consequently the photosensor changes from an "off" to an "on" condition as it passes by, thereby initiating the generation of an output impulse over the first output line 33 as each transparency 19a is scanned. If, on the other hand, the code wheel 10 is traveling clockwise or from left-to-right in FIGURE 2, the leading edge 21 approaches the photosensor from the left and after passing, the sensor is changed from an "on" to an "off" condition, thereby initiating the generation of an output impulse over the second output line 39 as each transparency 19a is scanned. In both instances, the passage of the trailing edge 40 of each transparency 19a merely serves to reset the flip-flop 29, 30 since the gates 32 and 38 are always closed when the trailing edge 40 pass the photosensor due to the fact that the opaque markings 20b prevent the light beam from energizing photosensor 13.

As discussed above, the flip-flop elements 29 and 30 respond to the state of photosensor 12 to initiate output impulses over one or the other of lines 33 or 39 to represent the change of state. That is, if photosensor 12 varies from an "off" condition to an "on" condition, flip-flop element 29 is made conducting and an impulse is transmitted over output line 33, whereas if photosensor 12 varies from an "on" to an "off" condition, flip-flop element 30 is made conducting and an impulse is transmitted over output line 39 if and only if photosensor 13 is "on." During the resetting of the flip-flop elements 29 and 30, impulses are not transmitted over the output lines 33 and 39 due to the closing of gate circuits 32 and 38. However, it is also necessary that flip-flop elements 29 and 30 initiate such impulses only when they are changing from a non-conducting condition to a conducting condition, otherwise during each change of the flip-flop elements, impulses would be directed over both lines 33 and 39. To discriminate between the desired steep wave front voltages produced by flip-flop elements 29 and 30 and permit impulses to be produced only when these elements vary from a non-conducting condition to a conducting condition, the pulse forming circuits 31 and 37 may be suitably biased so that each will transmit an impulse only after receiving a steep wave front voltage of one polarity, but will not respond to a steep wave front voltage of the opposite polarity. For example, when the photosensor 12 varies from an "off" to an "on" condition after the passage of the leading edge 21 of transparent marking 19a in a direction from right-to-left in FIGURE 2, the flip-flop element 29 is changed from a non-conducting to a conducting condition, and the resulting steep wave front initiates an impulse through pulse forming amplifier 31 and over output line 33. However, at this same time, the other flip-flop element 30 is also varying from a conducting condition to a non-conducting condition and consequently produces a steep wave front voltage of the opposite polarity to pulse forming amplifier 37. This latter steep wave front voltage does not initiate a spurious impulse over the other output line 39 due to the fact that pulse forming amplifier 37 is biased to resopnd only to steep wave front signals of the opposite polarity. Thus, each time that photosensor 12 changes from an "off" to an "on" condition as the code wheel 10 travels in a counter-clockwise direction, an impulse is produced only over output line 33 and not over the other output line 39, and when the code wheel 10 travels in a clockwise direction, impulses are produced only over output line 39, but not over the first output line 33.

*Memory circuit operation*

The output impulses being produced over lines 33 and 39 are preferably directed to electronic counter or memory circuit (not shown). However, to reduce the size of such counter, it is desired that a relatively low count capacity counter be employed for summing only a relatively few counts and that this counter be periodically scanned and the count contained therein be transferred during such scanning to a main computing system which may be located remotely from the pickoff. As is known to those skilled in the art, the scanning and transfer of counts from such a counter or memory device may be performed quite rapidly and, in fact, more rapidly than the pickoff response to the passage of two incremental transparent portions 19a. However, it is still possible that the photosensor 12 may experience a change from an "on" to an "off" condition, or the reverse, during such transfer of the count to the main computer.

To permit the pickoff device to remember any such change of condition as might occur during the transfer process and to prevent its changing the contents of the small buffer storage during scanning, a pair of hold gate circuits 28 and 36, as discussed above, are provided in the channels from photosensor 12. These hold circuits 28 and 36 may be well known gate circuits adapted to respond to a potential over line 42 to prevent any change in the signal voltage being generated by photosensor 12 from producing a change of state of the flip-flop elements 29 and 30 during the count transferring period.

More specifically, during the count transfer period, a potential is generated over line 42 to close the gate circuits 28 and 36, and thereby prevent any variation in the output of photosensor 12 from changing the relative conducting condition of flip-flop elements 29 and 30. If photosensor 12 should vary in potential during such a transfer period, its changed potential is directed through either inverter 34 or amplifier 27, as before, to energize the upper line 35 or the lower line 43, but is prevented from passing through the gate circuits 28 and 36. After the count transfer has been completed, the potential on hold line 42 is restored to its original value, opening gates 28 and 36 quite rapidly and permitting the changes in potential on either line 35 or line 43 to pass through the gates and energize flip-flop element 29 or 30, thereby changing the conducting condition of the flip-flop elements. This change in the flip-flop elements 29 and 30 initiates an impulse through pulse forming circuits 31 or 37, as before, to transmit an impulse over output line 33 or 39 corresponding to the change in photosensor 12 that previously occurred during the count transfer period. Thus the addition of the rapidly operating gate circuits 28 and 36, as controlled by the main computer, permits the pickoff logic circuit to delay the transmission of and remember any incremental changes that occurred in the position of code wheel 10 during the brief time period that the count in the small buffer storage was being transferred to the main computer.

According to the preferred embodiment of the invention, all of the amplifying circuits, gate circuits, inverter circuits, the flip-flop device, and pulse forming amplifiers are preferably constructed as well known transistor elements and sub-miniature resistors and capacitors for the purpose of reducing the size and weight of the logic circuitry of FIGURE 4. For example, the input amplifiers 24 and 26 amy be well known transistorized amplifiers of small size and few components, and the amplifiers 27, 41 and the pulse forming amplifiers 31 and 37 may preferably be suitably biased three element transistors connected in an emitter follower arrangement. Similarly, transistorized flip-flop circuit elements 29 and 30, as well as gate circuits 28, 36 and 32, 38 are well known, and further details thereof are believed unnecessary for the purposes of the present invention.

Furthermore, although a preferred embodiment, as described above, employs transparent code and opaque markings, together with photosensor sensing means for detecting the movement of the markings, it is intended that the invention is not so limited and that other than optical sensing means may be employed. Moreover, as is believed evident to those skilled in the art, it may not be essential in any given application that the code logic circuitry of FIGURE 4 be transistorized, and well known electron tube or other circuitry may be employed. Since these and other changes may be made by those skilled in the art, this invention is to be considered as being limited only according to the following claims.

What is claimed is:

1. In a digital device for determining the position of a member, a first sensor and circuit means for producing time displaced impulses over a first and second line for each incremental displacement of the member, a second sensor and circuit means for selectively enabling the transmission of pulses over said first and second lines depending upon the direction of rotation of said member, and memory hold means for delaying the transmission of said impulses over said first and second lines for a time delay less than the time of each incremental movement of said member, said memory hold means comprising switch means associated with said first sensor and energized by a hold signal for delaying the transmission of said time displaced impulses over said first and second lines.

2. A memory control circuit for a digitally operating measuring device comprising: a sensor for detecting a first change in condition and producing an increase in potential and a second change in condition for producing a decrease in potential, a limiter amplifier for transmitting the increase in potential over a first line and being unresponsive to the decrease in potential, an inverter for transmitting the decrease in potential over a second line and being unresponsive to the increase in potential, a pair of gate circuits, one gate circuit in each of said first and second lines, and a flip-flop circuit being reversedly energized by the outputs of the gate circuits, and means for transmitting a hold signal simultaneously to both gate circuits thereby to prevent variation in said flip-flop upon any change of condition being detected by said sensor during the application of said hold signal and upon removal of said hold signal permitting said flip-flop to vary if a change had been detected by said sensor during the application of the hold signal.

3. A digital impulse generating system for measuring movement of a member comprising: a reference member, a member movable relative to the reference member in a predetermined path, a control code representation supported on the movable member to move in said predetermined path relative to the stationary member, said code consisting of a first channel including mark and space components and a second channel also including mark and space components, with the two channels being relatively shifted in position phase, whereby each mark of the second channel overlaps the adjacent mark and space of the first channel, the edges on the same side of each pair of mark-space elements being utilized to determine the sensing movement of the movable member, regardless of the direction of movement of the movable member, means on the reference member for sensing movement of the code components past the reference member and the direction thereof and generating electrical signals, and logical circuit means responsive to said signals for producing a first series of impulses representing movement in a first direction and a second series of impulses representing movement in a second direction, and memory hold means for delaying the transmission of the first series of impulses and the second series of impulses for a time delay less than the time of each incremental movement of said movable member, said memory hold means comprising switch means associated with the reference member, and energized by a hold signal for delaying the transmission of said time displaced impulses.

4. A digital pickoff comprising: a movable member carrying a first series of regular mark-space elements in alignment with its direction of movement and a second series of similar mark-space elements spaced from the first series, with the leading edges of the second series of mark-space elements being position shifted relative to the leading edges of the first series by a distance that is a fractional part of the length of each mark element of the series, a first sensor for detecting movement of the space elements of the first series and producing a signal, a second sensor for detecting movement of the space elements of the second series and producing a signal, discriminating means responsive to the second sensor to produce a voltage signal over a first line when said second sensor detects a mark element and a voltage signal over a second line when the sensor detects a space element, and memory hold means for delaying the transmission of the voltage signals over said first and second lines for a time delay less than the time of each incremental movement of the movable member, over one pair of mark-space elements, said memory hold means comprising switch means associated with the first sensor, and energized by a hold signal for delaying the transmission of the time displaced voltage signals over the first and second lines, and means responsive to said first sensor and to the voltage signals over said two lines to transmit an impulse over a third line whenever a voltage signal occurs over the first line simultaneously with said first sensor detecting a space element and to transmit an impulse over a fourth line whenever a voltage signal occurs over the second line simultaneously with said first sensor detecting a space element.

5. In the device of claim 4, said discriminating means including means responsive to the second sensor signal exceeding a given value to produce said voltage signal over the first line, and means responsive to the second sensor signal being less than a given value to produce said voltage signal over the second line.

6. In the device of claim 4, said impulse transmitting means including a switching means responsive to the voltage signal over the first line to initiate an impulse over a given channel and responsive to the voltage signal over the second line to initiate an impulse over another channel and gating means responsive to the first sensor for selectively transmitting and preventing the transmission of the impulse over the given channel to the third line and the impulse over the other channel to the fourth line, respectively to the occurrence of these impulses, simultaneously with the first sensor detecting a space element.

7. In a device for measuring the displacement between two relatively movable members and the direction of such displacement, a pair of regular mark-space code elements supported on one member, each adapted to scan a different one of the code elements, one of said codes being position displaced from the other whereby when the members are relatively moving in one direction the elements of one of the codes are scanned in advance of the other and when the members are relatively moving in the oppossite direction, the scanning sequence is reversed, a pulse producing discriminating means responsive to both sensing devices to produce a series of impulses over a first output line proportional to the number of mark-space code elements traversed during displacement in said one direction, and a second series of impulses over a second output line proportional to the number of mark-space elements traversed in the opposite direction, and memory hold means for delaying the transmission of said impulses over said first and second lines for a time delay less than the time of each incremental movement of the relatively movable member, said memory hold means comprising switch means associated with one of the sensing devices and energized by a hold signal for delaying the transmission of the time displaced impulses over said first and second output lines.

8. In a device for measuring the displacement between two relatively movable members and the direction of such displacement, a pair of regular mark-space code elements supported on one member, a pair of sensing devices on the other member, each adapted to scan a different one of the code elements, one of said codes being position displaced from the other whereby when the members are relatively moving in one direction the elements of one of the codes are scanned in advance of the other and when the members are relatively moving in the opposite direction, the scanning sequence is reversed, a pulse producing discriminating means responsive to both sensing devices to produce a series of impulses over a first output line proportional to the number of mark-space code elements traversed during displacement in said one direction, and a second series of impulses over a second output line proportional to the number of mark-space elements traversed in the opposite direction, and memory hold means for delaying the transmission of said impulses over said first and second output lines for a time delay less than the time of each incremental movement of one of said relatively movable members, said memory hold means comprising switch means associated with one of the sensing devices, and energized by a hold signal for delaying the transmission of the time displaced impulses over said first and second output lines, said sensing devices each generating a signal of given amplitude upon scanning a mark element and a signal of greater amplitude upon scanning a space element, said sensing devices including a pair of photosensitive sensors, said pulse producing discriminating means including a switching means having two stable states, means responsive to the given amplitude signal of one photosensitive sensor to position the switching means in one state and responsive to the higher amplitude signal to position the switching means in its other state, pulse producing means responsive to the switching means being positioned in one state during state changing to produce an impulse over a first output line and said pulse producing means being positioned in its other state during state changing to produce an impulse over a second output line, and means responsive to the higher signal of the other photosensitive sensor to selectively transmit said impulses over the first and second output lines.

9. A digital pickoff comprising: a movable member carrying a first series of regular mark-space elements in alignment with its direction of movement and a second series of similar mark-space elements in its direction of movement, with the leading edges of the second series of mark-space elements being position shifted relative to the leading edges of the first series by a distance that is a fractional part of the length of each mark element of the series, a first sensor for detecting the mark-space elements of the first series and producing a signal, a second sensor for detecting the mark-space elements of the second series and producing a signal, discriminating means responsive to the second sensor to produce an impulse over a first line when said second sensor detects a change from a mark element to a space element and an impulse over a second line when said second sensor detects a change from a space element to a mark element, and memory hold means for delaying the transmission of said impulses over the first and second lines, for a time delay less than the time of each incremental movement of the movable member over one pair of mark-space elements, said memory hold means comprising switch means associated with the first sensor and energized by a hold signal for delaying the transmission of said time displaced impulses over the first and second lines, and means responsive to said first sensor and to the impulses over said two lines to transmit an impulse over a third line whenever an impulse is transmitted over said first line simultaneously with said first sensor detecting a space element and to transmit an impulse over a fourth line whenever an impulse is transmitted over said second line simultaneously with said first sensor detecting a space element.

10. In the pickoff of claim 9, said discriminating means including a flip-flop circuit responsive to said second sensor for producing an increased signal of given amplitude over a fifth line whenever said second sensor detects a mark element and producing increased signal of given amplitude over a sixth line whenever said second sensor detects a space element, and first impulse producing means responsive to said increased signal over said fifth line for producing said impulse over said first line, and a second impulse producing means responsive to said increased signal over said sixth line for producing said impulse over said second line.

11. In a digital system for determining the extent of movement of a member, a first sensor for producing an increased change of voltage over a line in response to the beginning of each incremental change in the position of the member and a decreased voltage to its original value upon a completion of the incremental change, a limiter amplifier for transmitting the increase in voltage over a first line, and being unresponsive to the decrease in voltage, an inverter for transmitting the decrease in voltage over a second line and being unresponsive to the increase in voltage, a pair of gate circuits, one gate circuit being connected into each of said first and second lines, a flip-flop circuit reversibly energized by the outputs of the gate circuits for responding to each increased voltage and assuming a first stability condition and producing an output pulse over the first line, and responsive to each decreased voltage and assuming the opposite stability condition and producing an output pulse over the second line, a second sensor and means energized by said second sensor for selectively transmitting said pulses over said first and second lines responsively to the direction of movement of the member, and means for transmitting a hold signal simultaneously to both gate circuits, thereby to prevent variation in said flip-flop circuit upon any change of condition being detected by said sensor during the application of the hold signal and upon removal of said hold signal permitting said flip-flop circuit to vary if a change had been detected by said sensor during the application of the hold signal.

12. In a device for measuring the displacement between two relatively movable members and the direction of such displacement, the first movable member carrying a first series of regular mark-space elements, in alignment with its direction of movement and a second series of mark-space elements, with the second series of mark-space elements position shifted relative to the leading edges of the first series by a distance which is a fractional part of each mark element of the series, a first sensor for detecting movement of the space elements and producing a signal, a second sensor for detecting movement of the space elements of the second series and producing a signal, circuit means adapted to receive the signal from the first sensor, circuit means adapted to receive the signal from the second sensor, a memory flip-flop incorporated in the circuit means connected to the first sensor, a plurality of associated gates controlled the change of state of one half of each flip-flop, the second circuit means also partially controlling the associated gates, depending upon the momentary state of the second series of mark-space elements, the change of state in the flip-flop, and the signal gate of the second circuit means, generating a train of pulses in one output line for increments of the relative movement between the movable members in one direction, and a train of pulses in the second output line for increments of the relative movement between the movable members in the opposite direction, regardless of the rate of movement of the movable members, and memory hold means for delaying the transmission of the first series of impulses and the second series of impulses for a time delay less than the time of each incremental movement of said movable member, said memory hold means comprising switch means associated with the reference member, and energized by a hold signal for delaying the transmission of said time displaced impulses.

References Cited in the file of this patent
UNITED STATES PATENTS

| | | |
|---|---|---|
| 2,656,106 | Stabler | Oct. 20, 1953 |
| 2,685,082 | Beman | July 27, 1954 |
| 2,796,598 | Cartwright | June 18, 1957 |